United States Patent
Young et al.

(10) Patent No.: US 8,727,112 B2
(45) Date of Patent: May 20, 2014

(54) AGGLOMERATE REDUCTION IN A NANOWIRE SUSPENSION STORED IN A CONTAINER

(71) Applicants: Michael Eugene Young, Emeryville, CA (US); Arjun Daniel Srinivas, San Francisco, CA (US); Matthew R. Robinson, San Francisco, CA (US)

(72) Inventors: Michael Eugene Young, Emeryville, CA (US); Arjun Daniel Srinivas, San Francisco, CA (US); Matthew R. Robinson, San Francisco, CA (US)

(73) Assignee: Innova Dynamics, Inc., San Francisco, CA (US)

( * ) Notice: Subject to any disclaimer, the term of this patent is extended or adjusted under 35 U.S.C. 154(b) by 0 days.

(21) Appl. No.: 13/921,086

(22) Filed: Jun. 18, 2013

(65) Prior Publication Data

US 2013/0334075 A1 Dec. 19, 2013

Related U.S. Application Data

(60) Provisional application No. 61/660,940, filed on Jun. 18, 2012.

(51) Int. Cl.
*B82B 3/00* (2006.01)
*B65D 85/00* (2006.01)
*B65D 81/24* (2006.01)

(52) U.S. Cl.
USPC ........ 206/205; 220/573.2; 220/578; 220/890; 215/267; 422/500; 422/912; 977/840; 977/841; 977/855; 977/880; 977/963

(58) Field of Classification Search
None
See application file for complete search history.

(56) References Cited

U.S. PATENT DOCUMENTS

| | | | | |
|---|---|---|---|---|
| 4,824,560 A * | 4/1989 | Alspector | ...................... | 209/208 |
| 6,267,989 B1 | 7/2001 | Liversidge et al. | | |
| 7,122,106 B2 * | 10/2006 | Lin et al. | ........................ | 205/109 |
| 7,344,691 B2 * | 3/2008 | Chen et al. | ................. | 423/447.2 |
| 7,745,498 B2 * | 6/2010 | Pereira et al. | .................... | 516/33 |
| 8,216,636 B2 * | 7/2012 | Chan et al. | ..................... | 427/122 |
| 8,273,581 B2 * | 9/2012 | Schabron et al. | ............. | 436/181 |
| 8,293,624 B2 * | 10/2012 | Romano et al. | ............... | 438/478 |
| 8,465,647 B2 * | 6/2013 | Bol et al. | ...................... | 210/634 |
| 2001/0023262 A1 | 9/2001 | Raynolds et al. | | |
| 2006/0008942 A1* | 1/2006 | Romano et al. | .................. | 438/99 |
| 2006/0270777 A1* | 11/2006 | Wise et al. | .................... | 524/496 |
| 2007/0067288 A1 | 3/2007 | Chung | | |

(Continued)

FOREIGN PATENT DOCUMENTS

| | | |
|---|---|---|
| WO | WO-2007/067288 A2 | 6/2007 |
| WO | WO 2010/129604 A1 | 11/2010 |
| WO | WO-2011/126870 A2 | 10/2011 |

OTHER PUBLICATIONS

ProQuest Dialog NPL Search Results, EIC Researcher Elizabeth Tweig.*

(Continued)

*Primary Examiner* — Mickey Yu
*Assistant Examiner* — Gideon Weinerth
(74) *Attorney, Agent, or Firm* — Foley & Lardner LLP; Cliff Z. Liu

(57) ABSTRACT

Methods and articles of manufacture for storage and shipping of nanowires are disclosed. One disclosed method includes: (a) providing a nanowire suspension including nanowires suspended in a liquid; and (b) disposing the nanowire suspension in a container for storage and shipping, where the container is configured to inhibit agglomeration of nanowires from the nanowire suspension.

13 Claims, 7 Drawing Sheets

(56) References Cited

U.S. PATENT DOCUMENTS

| | | |
|---|---|---|
| 2007/0085054 A1 | 4/2007 | Lin |
| 2008/0224123 A1* | 9/2008 | Martin et al. .................. 257/23 |
| 2009/0166312 A1* | 7/2009 | Giraud .......................... 215/235 |
| 2009/0311530 A1* | 12/2009 | Hirai et al. .................... 428/401 |
| 2010/0055199 A1* | 3/2010 | Mansoori ...................... 424/618 |
| 2010/0086787 A1* | 4/2010 | Qi et al. ........................ 428/421 |
| 2010/0105880 A1* | 4/2010 | Sooter .......................... 530/402 |
| 2010/0143582 A1* | 6/2010 | Lieber et al. ................. 427/98.4 |
| 2011/0023658 A1* | 2/2011 | Wang et al. ..................... 75/370 |
| 2011/0042618 A1* | 2/2011 | Strano et al. ............. 252/301.36 |
| 2012/0041246 A1* | 2/2012 | Scher et al. ................... 585/500 |
| 2012/0091026 A1 | 4/2012 | Chacornac et al. |
| 2012/0196990 A1* | 8/2012 | Ramstack et al. ............ 525/450 |
| 2012/0247275 A1* | 10/2012 | Yang et al. ...................... 75/370 |
| 2012/0297927 A1* | 11/2012 | Whitcomb ...................... 75/343 |
| 2012/0328469 A1* | 12/2012 | Zhang et al. ................. 420/501 |
| 2012/0329888 A1* | 12/2012 | Engel et al. ................... 516/194 |
| 2013/0000952 A1* | 1/2013 | Srinivas et al. ............ 174/126.1 |
| 2013/0008690 A1* | 1/2013 | Wiley et al. ............... 174/120 C |
| 2013/0056244 A1* | 3/2013 | Srinivas et al. ............... 174/250 |
| 2013/0240241 A1* | 9/2013 | Dubrow et al. ........... 174/113 R |
| 2013/0251943 A1* | 9/2013 | Pei et al. ....................... 428/141 |
| 2013/0277625 A1* | 10/2013 | Srinivas et al. ............... 252/514 |
| 2013/0283974 A1* | 10/2013 | Lunn et al. ..................... 75/370 |

OTHER PUBLICATIONS

Proquest Dialog Patent Search Results, EIC Researcher Elizabeth Tweig.*

NanoComposix Organic-Solvent Compatible Nanoparticle Storage and Handling Procedures. www.nanocomposix.com http://nanocomposix.com/sites/default/files/storage-handling/Organic_SAH_Protocol.pdf, Accessed Dec. 20, 2013.*

NanoComposix Storage and Handling Procedures www.nanocomposix.com http://nanocomposix.com/sites/default/files/storage-handling/NanoComposix%20Storage%20and%20Handling.pdf, Accessed Dec. 20, 2013.*

Thermoscientific Online Catalog, Nalgene Teflon FEP lined narrow mouth bottle http://www.thermoscientific.com/en/product/nalgene-teflon-fep-low-particulate-low-metals-bottles-closure.html.*

International Search Report for International Application No. PCT/US2013/046419 dated Oct. 14, 2013.

Tang, et al., "Syntheses of Silver Nanowires in liquid phase", Nanowires Science and Technology, pp. 25-42, (2010).

* cited by examiner

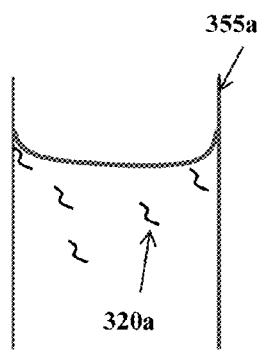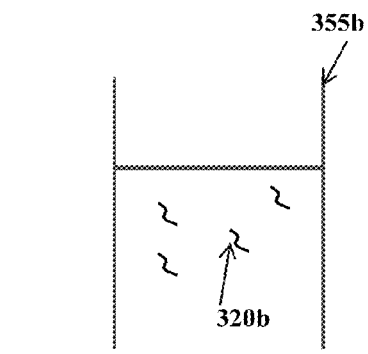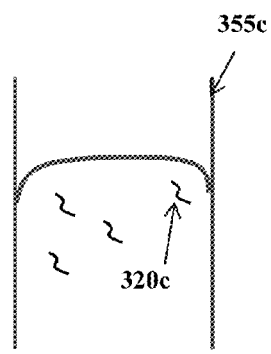
FIG. 3(a)  FIG. 3(b)  FIG. 3(c)
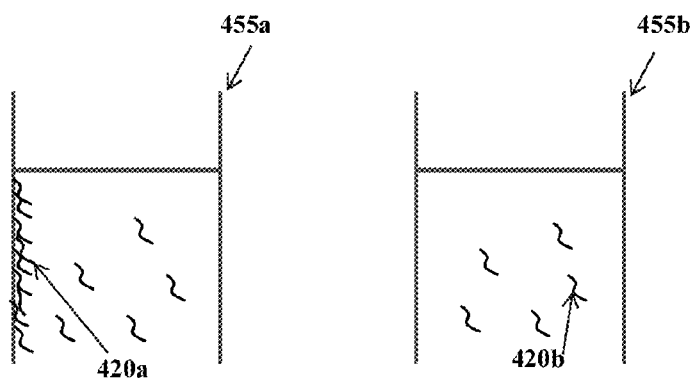
FIG. 4(a)  FIG. 4(b)

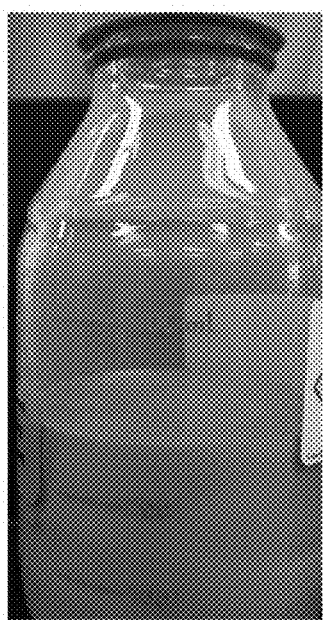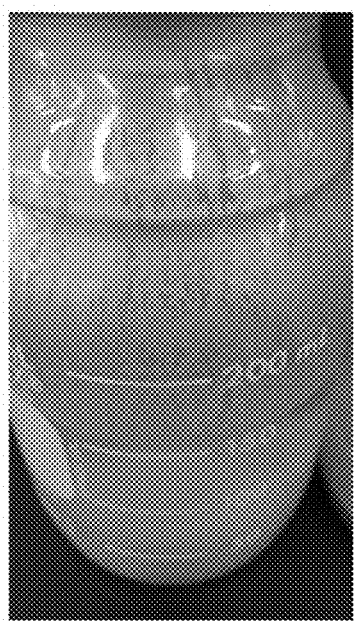
FIG. 6(a)      FIG. 6(b)      FIG. 6(c)

AGGLOMERATE REDUCTION IN A NANOWIRE SUSPENSION STORED IN A CONTAINER

CROSS REFERENCE TO RELATED APPLICATION

This application claims the benefit of U.S. Provisional Application No. 61/660,940, filed on Jun. 18, 2012, the disclosure of which is incorporated herein by reference in its entirety.

FIELD OF THE INVENTION

The invention relates generally to nanowires. More particularly, the invention relates to agglomerate reduction in nanowire suspensions.

BACKGROUND

Nanostructures can differ markedly from their analogous bulk materials. In particular, efforts have been made to synthesize nanowires to exploit their properties for various applications.

There are two basic approaches of synthesizing nanowires: top-down and bottom-up. In a top-down approach, a large piece of material is reduced down to small pieces through techniques such as lithography and electrophoresis. In a bottom-up approach, nanowires are synthesized by combination of constituent atoms. Most of the synthesis techniques are based on the bottom-up approach.

One particular bottom-up approach is referred to as solution synthesis. In solution synthesis, nanowires can be grown from a reaction mixture including a solvent, a reagent including a material forming the nanowires, and a templating agent. As the reaction mixture is heated, the templating agent can bind to a lateral crystal face of a nanowire seed, thereby inducing preferentially growth along a longitudinal direction that is substantially perpendicular to the lateral crystal face.

Once nanowires are synthesized, the nanowires can be suspended in a solvent, and the resulting suspension can be transferred to a container for storage and shipping.

It is against this background that a need arose to develop the embodiments described herein.

SUMMARY

One aspect of this disclosure relates to a method of storing nanowires. In one embodiment, the method includes: (a) providing a nanowire suspension including nanowires suspended in a liquid; and (b) disposing the nanowire suspension in a container for storage, where the container is configured to inhibit agglomeration of nanowires from the nanowire suspension.

In some implementations, a head space of the container is sized to inhibit evaporation of the liquid from the nanowire suspension. In some implementations, a wall of the container is resistant to adhesion of nanowires from the nanowire suspension. In some implementations, a wall of the container is resistant to wetting by the liquid. In some implementations, a wall of the container is formed of, or coated with, a fluorinated polymer, such as one selected from polytetrafluoroethylene, fluorinated ethylene propylene, and ethylene tetrafluoroethylene. In some implementations, disposing the nanowire suspension in the container is performed subsequent to synthesis of the nanowires in the nanowire suspension.

In some implementations, a head space of the container is sized to inhibit evaporation of the liquid from the nanowire suspension, and a wall of the container is resistant to wetting by the liquid. In such implementations, the wall of the container can be formed of, or coated with, a fluorinated polymer, such as fluorinated ethylene propylene.

In some implementations, the container includes a moveable plunger sized and shaped to fit an internal cross-section of the container, and disposing the nanowire suspension in the container includes confining the nanowire suspension to a volume between the moveable plunger and an opening of the container. In such implementations, a wall of the container can be resistant to wetting by the liquid.

In some implementations, a head space of the container is sized such that a ratio of a volume of the head space to a total internal volume of the container is less than or equal to 10%, such as less than or equal to 5%, less than or equal to 4%, less than or equal to 3%, less than or equal to 2%, or less than or equal to 1%.

In some implementations, a wall of the container is resistant to wetting by the liquid, and the wall forms a contact angle with the liquid that is greater than or equal to 90°, such as greater than or equal to 95°, greater than or equal to 100°, greater than or equal to 105°, greater than or equal to 110°, greater than or equal to 115°, greater than or equal to 120°, greater than or equal to 125°, greater than or equal to 130°, greater than or equal to 135°, greater than or equal to 140°, greater than or equal to 145°, or greater than or equal to 150°.

In some implementations, a shelf life of the nanowire suspension stored in the container is at least 14 days, such as at least 30 days, at least 60 days, at least 90 days, at least 120 days, at least 150 days, at least 180 days, or at least 365 days.

In another embodiment, the method includes: (a) providing a nanowire suspension including nanowires suspended in a liquid; and (b) disposing the nanowire suspension in a container for storage, where a wall of the container is at least one of: (1) resistant to adhesion of nanowires from the nanowire suspension; and (2) resistant to wetting by the liquid.

In some implementations, the wall of the container is formed of, or coated with, a fluorinated polymer, such as fluorinated ethylene propylene. In some implementations, a head space of the container is sized to inhibit evaporation of the liquid from the nanowire suspension.

Another aspect of this disclosure relates to an article of manufacture. In one embodiment, the article of manufacture includes: (a) a storage container; and (b) a nanowire suspension disposed in the storage container, where the nanowire suspension includes nanowires suspended in a liquid, and the storage container is configured to inhibit agglomeration of nanowires from the nanowire suspension.

In some implementations, the storage container includes a wall formed of, or coated with, a material that is resistant to adhesion of nanowires from the nanowire suspension. In some implementations, the storage container includes a wall formed of, or coated with, a material that is resistant to wetting by the liquid. In some implementations, the storage container includes a wall that is formed of, or coated with, a fluorinated polymer, such as fluorinated ethylene propylene.

In some implementations, a head space of the storage container is sized to inhibit evaporation of the liquid from the nanowire suspension. In some implementations, the storage container is configured with an adjustable head space. In some implementations, the storage container includes a moveable plunger sized and shaped to fit an internal cross-section of the storage container, and the nanowire suspension is confined to a volume between the moveable plunger and an opening of the storage container. In such implementations, the storage container can include a wall that is formed of, or coated with, a fluorinated polymer.

In some implementations, a head space of the storage container is sized such that a ratio of a volume of the head space to a total internal volume of the storage container is less than or equal to 10%, such as less than or equal to 5%, less than or equal to 4%, less than or equal to 3%, less than or equal to 2%, or less than or equal to 1%.

In some implementations, the storage container includes a wall that is resistant to wetting by the liquid, and the wall forms a contact angle with the liquid that is greater than or equal to 90°, such as greater than or equal to 95°, greater than or equal to 100°, greater than or equal to 105°, greater than or equal to 110°, greater than or equal to 115°, greater than or equal to 120°, greater than or equal to 125°, greater than or equal to 130°, greater than or equal to 135°, greater than or equal to 140°, greater than or equal to 145°, or greater than or equal to 150°.

In some implementations, a shelf life of the nanowire suspension disposed in the storage container is at least 14 days, such as at least 30 days, at least 60 days, at least 90 days, at least 120 days, at least 150 days, at least 180 days, or at least 365 days.

In another embodiment, the article of manufacture includes: (a) a storage container; and (b) a nanowire suspension disposed in the storage container, where the nanowire suspension includes nanowires suspended in a liquid, and the storage container includes a wall formed of, or coated with, a material that is at least one of: (1) resistant to adhesion of nanowires from the nanowire suspension; and (2) resistant to wetting by the liquid.

In some implementations, the wall of the storage container is formed of, or coated with, a fluorinated polymer, such as fluorinated ethylene propylene. In some implementations, a head space of the storage container is sized to inhibit evaporation of the liquid from the nanowire suspension. In some implementations, the storage container is configured with an adjustable head space.

Other aspects and embodiments of this disclosure are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of this disclosure, reference should be made to the following detailed description taken in conjunction with the accompanying drawings.

FIG. 3(a), FIG. 3(b), and FIG. 3(c) show different shapes of a liquid meniscus that can result from adjusting a wettability of inner wall surfaces, in accordance with an embodiment of this disclosure.

FIG. 4(a) and FIG. 4(b) show different extents of adhesion of nanowires to inner wall surfaces, in accordance with an embodiment of this disclosure.

FIG. 6(a), FIG. 6(b), and FIG. 6(c) are images showing evaluation results in connection with some aspects of this disclosure.

DETAILED DESCRIPTION

Definitions

Figure 1A:
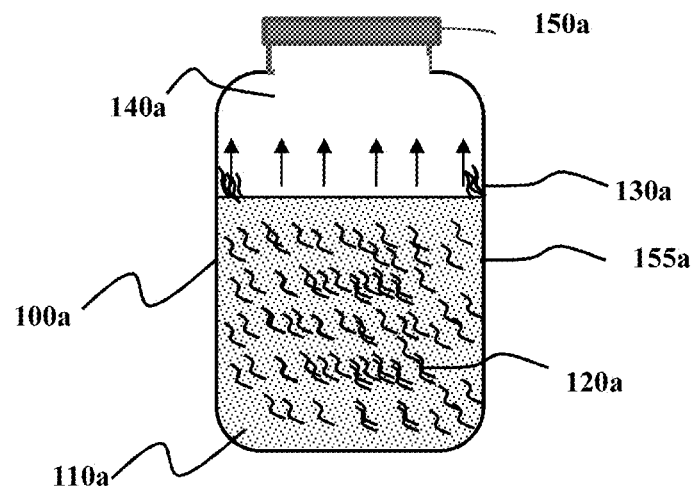
FIG. 1(a) shows the problem of agglomeration of nanowires stored in a container.

The following definitions apply to some of the aspects described with regard to some embodiments of this disclosure. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set can also be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be connected to one another or can be formed integrally with one another.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the terms "optional" and "optionally" mean that the subsequently described event or circumstance may or may not occur and that the description includes instances where the event or circumstance occurs and instances in which it does not.

As used herein, the terms "adhesion," "adhere," and "adhering" encompass deposition of a set of objects on a surface, bonding of a set of objects to a surface, absorption of a set of objects onto a surface, adsorption of a set of objects onto a surface, or a set of objects coming in contact with or becoming adjacent to a surface.

As used herein, the term "nanometer range" or "nm range" refers to a range of dimensions from about 1 nm to about 1 micrometer (µm). The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 µm.

As used herein, the term "micrometer range" or "µm range" refers to a range of dimensions from about 1 µm to about 1 millimeter (mm). The µm range includes the "lower μm range," which refers to a range of dimensions from about 1 μm to about 10 μm, the "middle μm range," which refers to a range of dimensions from about 10 μm to about 100 μm, and the "upper μm range," which refers to a range of dimensions from about 100 μm to about 1 mm.

As used herein, the term "nanostructure" refers to an object that has at least one dimension in the nm range. A nanostructure can have any of a wide variety of shapes, and can be formed of a wide variety of materials. Examples of nanostructures include nanowires, nanotubes, and nanoparticles.

As used herein, the term "nanowire" refers to an elongated nanostructure that is substantially solid. Typically, a nanowire has a lateral dimension (e.g., a cross-sectional dimension in the form of a width, a diameter, or a width or diameter that represents an average across orthogonal directions) in the nm range, a longitudinal dimension (e.g., a length) in the μm range, and an aspect ratio that is about 3 or greater.

As used herein, the term "nanotube" refers to an elongated, hollow nanostructure. Typically, a nanotube has a lateral dimension (e.g., a cross-sectional dimension in the form of a width, an outer diameter, or a width or outer diameter that represents an average across orthogonal directions) in the nm range, a longitudinal dimension (e.g., a length) in the μm range, and an aspect ratio that is about 3 or greater.

As used herein, the term "nanoparticle" refers to a spheroidal nanostructure. Typically, each dimension (e.g., a cross-sectional dimension in the form of a width, a diameter, or a width or diameter that represents an average across orthogonal directions) of a nanoparticle is in the nm range, and the nanoparticle has an aspect ratio that is less than about 3, such as about 1.

As used herein, the term "microstructure" refers to an object that has at least one dimension in the μm range. Typically, each dimension of a microstructure is in the μm range or beyond the μm range. A microstructure can have any of a wide variety of shapes, and can be formed of a wide variety of materials. Examples of microstructures include microwires, microtubes, and microparticles.

As used herein, the term "microwire" refers to an elongated microstructure that is substantially solid. Typically, a microwire has a lateral dimension (e.g., a cross-sectional dimension in the form of a width, a diameter, or a width or diameter that represents an average across orthogonal directions) in the μm range and an aspect ratio that is about 3 or greater.

As used herein, the term "microtube" refers to an elongated, hollow microstructure. Typically, a microtube has a lateral dimension (e.g., a cross-sectional dimension in the form of a width, an outer diameter, or a width or outer diameter that represents an average across orthogonal directions) in the μm range and an aspect ratio that is about 3 or greater.

As used herein, the term "microparticle" refers to a spheroidal microstructure. Typically, each dimension (e.g., a cross-sectional dimension in the form of a width, a diameter, or a width or diameter that represents an average across orthogonal directions) of a microparticle is in the μm range, and the microparticle has an aspect ratio that is less than about 3, such as about 1.

Storage of Nanowires

Embodiments of this disclosure relate to storage of nanostructures while reducing or inhibiting the formation of agglomerates of the nanostructures. Examples of nanostructures include nanowires, which can be formed of a variety of materials, including metals (e.g., silver (or Ag), nickel (or Ni), platinum (or Pt), copper (or Cu), and gold (or Au)), semiconductors (e.g., silicon (or Si), indium phosphide (or InP), gallium nitride (or GaN)), conducting oxides and chalcogenides that are optionally doped and transparent (e.g., metal oxides and chalcogenides that are optionally doped and transparent), electrically conductive polymers (e.g., polyaniline, poly (acetylene), poly(pyrrole), poly(thiophene), poly(p-phenylene sulfide), poly(p-phenylene vinylene), poly(3-alkylthiophene), olyindole, polypyrene, polycarbazole, polyazulene, polyazepine, poly(fluorene), polynaphthalene, melanins, poly(3,4-ethylenedioxythiophene) (or PEDOT), poly(styrenesulfonate) (or PSS), PEDOT-PSS, PEDOT-polymethacrylic acid, poly(3-hexylthiophene), poly(3-octylthiophene), poly(C-61-butyric acid-methyl ester), and poly[2-methoxy-5-(2'-ethyl-hexyloxy)-1,4-phenylene vinylene]), insulators (e.g., silica ($SiO_2$) and titania (or $TiO_2$)), and any combination thereof. Nanowires can have a core-shell configuration or a core-multi-shell configuration.

Although certain embodiments are described in the context of nanowires, additional embodiments can be implemented for the storage of other types of nanostructures, such as other types of nanostructures that are generally elongated and having an aspect ratio of about 3 or greater. Further embodiments can be implemented for the storage of microstructures, such as microstructures that are generally elongated and having an aspect ratio of about 3 or greater.

In some embodiments, nanowires are formed according to a solution synthesis reaction. In a solution synthesis reaction, nanowires can be grown from a reaction mixture including a solvent, a reagent including a material forming the nanowires, and a templating agent. As the reaction mixture is heated, the templating agent (e.g., a capping agent) can bind to a lateral crystal face of a nanowire seed, impeding growth in the lateral directions and, thereby, inducing preferentially growth along a longitudinal direction that is substantially perpendicular to the lateral crystal face. An example of a solution synthesis reaction is sometimes referred to as the polyol process for the production of metal nanowires, where a capping agent can bind to the {1 0 0} face of the 5-fold twinned seed structure, allowing growth on the {1 1 1} face. Other types of solution synthesis reactions are encompassed by this disclosure. In addition, nanowires formed according to electrospinning are encompassed by this disclosure.

In the case of metal nanowires, examples of suitable metal-containing reagents include metal salts, such as silver nitrate (or $AgNO_3$), silver acetate (or $(CH_3COO)_2Ag$), trifluorosilver acetate (or $(CF_3COO)_2Ag$), silver phosphate (or $Ag_3PO_4$), silver perchlorate (or $AgClO_4$), gold perchlorate (or $Au(ClO_4)_3$), chloroauric acid (or $HAuCl_4$), palladium (II) chloride (or $PdCl_2$), palladium acetylacetonate (or $Pd(C_5H_7O_2)_2$), palladium nitrate (or $Pd(NO_3)_2$), potassium tetrachloropalladate(II) (or $K_2PdCl_4$), platinum (II) chloride (or $PtCl_2$), potassium hexachloroplatinate (or $K_2PtCl_6$), chloroplatinic acid (or $H_2PtCl_6$), platinum acetylacetonate (or $Pt(C_5H_7O_2)_2$), and any combination thereof. Examples of suitable templating agents (also sometimes referred as "capping agents") include polyvinylpyrrolidone, polyarylamide, polyacrylic, and any combination or copolymer thereof. Examples of suitable solvents include polar solvents in which a metal-containing reagent, a templating agent, and any other reactants or additives are sufficiently soluble. In addition, the solvent can function as a reducing agent to convert the metal-containing reagent to its corresponding elemental metal form. Typically, the reducing solvent includes at least two hydroxyl groups per molecule. Examples of suitable reducing solvents include diols, polyols, glycols, or mixtures thereof. More specifically, the reducing solvent can be, for example, ethylene glycol, 1,2-propylene glycol, 1,3-propylene glycol, glycerin, glycerol, glucose, or any combination thereof. The use of hydrophobic solvents, such as non-polar solvents, are also encompassed by this disclosure. Additional additives or reactants can be included to increase yield and promote uniformity in nanowire morphology, such as iron salts including iron acetate, iron chloride, iron acetylacetonate in either the +2 or +3 valence, sodium chloride (or NaCl), platinum chloride (or $PtCl_2$), palladium chloride (or $PdCl_2$), quaternary ammonium salts (e.g., cetyltrimethylammonium bromide), and other salts or ionic additives.

Once a solution synthesis reaction is performed, an unpurified product from the reaction can be purified. Specifically, synthesized nanowires can be separated from other components of a reaction mixture, and then re-dispersed in a suitable solvent or other liquid to form a nanowire suspension. The nanowire suspension also can be formulated as a coating composition or an ink composition.

Examples of suitable re-dispersal solvents include alcohols, water, hydrocarbons (e.g., paraffins, halogenated hydrocarbons, and cycloaliphatic hydrocarbons), alkenes, alkynes, ketones, ethers, and combinations thereof. By way of example, nanowires can be re-dispersed in isopropyl alcohol, methanol, ethanol, water, or a combination thereof. Other specific examples of suitable solvents include 2-methyltetrahydrofuran, a chloro-hydrocarbon, a fluoro-hydrocarbon, acetaldehyde, acetic acid, acetic anhydride, acetone, acetonitrile, aniline, benzene, benzonitrile, benzyl alcohol, benzyl ether, butanol, butanone, butyl acetate, butyl ether, butyl formate, butyraldehyde, butyric acid, butyronitrile, carbon disulfide, carbon tetrachloride, chlorobenzene, chlorobutane, chloroform, cyclohexane, cyclohexanol, cyclopentanone, cyclopentyl methyl ether, diacetone alcohol, dichloroethane, dichloromethane, diethyl carbonate, diethyl ether, diethylene glycol, diglyme, di-isopropylamine, dimethoxyethane, dimethyl formamide, dimethyl sulfoxide, dimethylamine, dimethylbutane, dimethylether, dimethylformamide, dimethylpentane, dimethylsulfoxide, dioxane, dodecafluoro-1-hepatanol, ethanol, ethyl acetate, ethyl ether, ethyl formate, ethyl propionate, ethylene dichloride, ethylene glycol, formamide, formic acid, glycerine, heptane, hexafluoroisopropanol, hexamethylphosphoramide, hexamethylphosphorous triamide, hexane, hexanone, hydrogen peroxide, hypochlorite, i-butyl acetate, i-butyl alcohol, i-butyl formate, i-butylamine, i-octane, i-propyl acetate, i-propyl ether, isopropanol, isopropylamine, ketone peroxide, methanol and calcium chloride solution, methoxyethanol, methyl acetate, methyl ethyl ketone, methyl formate, methyl n-butyrate, methyl n-propyl ketone, methyl t-butyl ether, methylene chloride, methylene, methylhexane, methylpentane, mineral oil, m-xylene, n-butanol, n-decane, n-hexane, nitrobenzene, nitroethane, nitromethane, nitropropane, N-methyl-2-pyrrolidinone, n-propanol, octafluoro-1-pentanol, octane, pentane, pentanone, petroleum ether, phenol, propanol, propionaldehyde, propionic acid, propionitrile, propyl acetate, propyl ether, propyl formate, propylamine, p-xylene, pyridine, pyrrolidine, sodium hydroxide, sodium-containing solution, t-butanol, t-butyl alcohol, t-butyl methyl ether, tetrachloroethane, tetrafluoropropanol, tetrahydrofuran, tetrahydronaphthalene, toluene, triethyl amine, trifluoroacetic acid, trifluoroethanol, trifluoropropanol, trimethylbutane, trimethylhexane, trimethylpentane, valeronitrile, xylene, xylenol, and other similar compounds or solutions and any combination thereof.

More generally, a re-dispersal solvent can include water, an ionic or ion-containing solution, an ionic liquid, an organic solvent (e.g., a polar, organic solvent; a non-polar, organic solvent; an aprotic solvent; a protic solvent; a polar aprotic solvent, or a polar, protic solvent); an inorganic solvent, or any combination thereof. Oils also can be considered suitable solvents.

Once nanowires are re-dispersed and suspended in a suitable solvent or other liquid, the resulting nanowire suspension can be transferred to a container for handling, storage, and shipping. When nanowire suspensions are stored in containers formed of glass or other similar materials, agglomerates of nanowires tend to form in such suspensions during storage and shipping. In the case of silver nanowires, for example, agglomerate formation is particularly exacerbated when suspensions of silver nanowires are stored at higher concentrations of the silver nanowires (e.g., >10 mg/mL). Without being tied to a particular theory of operation, this effect may at least partially result from approaching or reaching a solubility limit for silver in isopropyl alcohol or other liquid. Additionally, as a concentration of silver nanowires in a suspension increases, the interaction between nanowires can play a greater role in the hydrodynamics of the suspension. For objects on the nanometer scale, random collisions with solvent molecules (sometimes referred to as Brownian Fluctuating Force) can be considered. In a crowded suspension, uneven pockets of solvent molecules can be present along the length of a nanowire, which can lead to an uneven Brownian Force along the length of the nanowire and, thus, a torque. The rotation of several nanowires near each other in a suspension can lead to the formation of bundles, braids, or "bird's nest" of nanowires. These bundles can be less stable in solution than individual wires, thereby precipitating out of the suspension and depositing on walls or a bottom of a container. Also without being tied to a particular theory of operation, the agglomeration of nanowires may result from other mechanisms, such as initial deposition of nanowires on walls of a container, followed by additional deposition of nanowires on the deposited nanowires, creating entanglement of nanowires as agglomerates.

Once nanowires become entangled into agglomerates, the nanowires cannot be readily salvaged. This is particularly a problem when the nanowires have higher aspect ratios or grow longer, and is in sharp contrast to nanoparticles or other spheroidal nanostructures. Unlike nanoparticles, agglomerated nanowires can be difficult to separate back into dispersed nanowires, as additional agitation, milling, or even ultrasonication can worsen the agglomeration or even destroy or fragment individual nanowires. Agglomerated nanowires can strongly adhere to walls of containers, and can represent a loss of useful material during storage and shipping. Agglomerated nanowires also can form clumps and destabilize and precipitate from a suspension, which can subsequently clog coating or printing machinery, cause streaking or other visible defects on a coating, and impede uniformity, low haze, and high transparency of a resulting film.

According to embodiments of this disclosure, the agglomeration of nanowires from a suspension stored in a container can be reduced or inhibited by storing the nanowire suspension in a manner that inhibits the formation of agglomerates. Some embodiments of this disclosure implement techniques to inhibit agglomerates of nanowires from a suspension adhering to walls of a container, or precipitating from the suspension. In some embodiments, a nanowire suspension is stored by inhibiting evaporation of a solvent or other liquid from the suspension, by inhibiting wetting of walls of the container by the solvent or other liquid, by inhibiting adhesion of nanowires to the walls of the container, or any combination of these techniques.

Figure 1B:
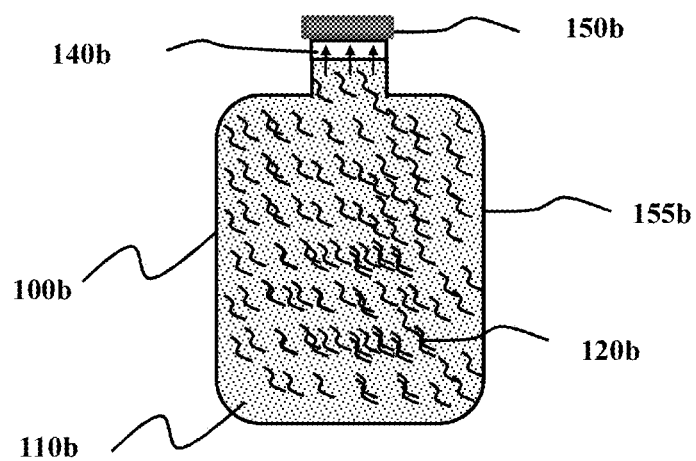
FIG. 1(b) shows solutions to solve the problem according to embodiments of this disclosure.

FIG. 1(a) shows the problem of nanowire agglomeration, and FIG. 1(b) shows a solution to the problem according to an embodiment of this disclosure. As shown in FIG. 1(a), a suspension includes nanowires 120a dispersed in a solvent 110a, and the suspension is disposed in a container 100a, such as a glass bottle. Although a closure 150a is secured to the container 100a, evaporation of the solvent 110a can take place in a head space 140a above a liquid meniscus of the suspension. In the case of a relatively large head space, a significant extent of evaporation can take place to the point that portions of the solvent 110a adjacent to the liquid meniscus evaporate from the suspension. This evaporation leaves behind nanowires 130a that adhere to a wall 155a of the container 100a and become entangled as agglomerates as shown in FIG. 1(a).

As shown in FIG. 1(b), one solution to this problem is to suitably size a head space 140b of a container 100b to control the extent of evaporation of a solvent 110b from a suspension of nanowires 120b. Specifically, the head space 140b of the container 100b is reduced by sizing or shaping of the container 100b (e.g., as a narrow-mouth bottle versus a wide-mouth bottle), by filling the container 100b with a sufficient volume of the suspension to reduce the remaining head space 140b, or a combination thereof. By reducing the head space 140b, evaporation of the solvent 110b is inhibited, thereby inhibiting the adhesion of the nanowires 120b to the wall 155a of the container 100b.

In some implementations, sizing of the head space 140b can be such that a ratio (expressed as a percentage) of a volume of the head space 140b to a total internal volume of the container 100b (e.g., a total capacity of the container 100b) can be less than or equal to about 10%, such as less than or equal to about 5%, less than or equal to about 4%, less than or equal to about 3%, less than or equal to about 2%, or less than or equal to about 1%, and down to about 0.5%, down to about 0.1%, down to about 0.05%, or even down to about 0%. In some implementations, sizing of the head space 140b can be such that a ratio (expressed as a percentage) of a width of a neck portion of the container 100b to a width of a main body portion of the container 100b can be less than or equal to about 70%, such as less than or equal to about 65%, less than or equal to about 60%, less than or equal to about 55%, less than or equal to about 50%, less than or equal to about 45%, or less than or equal to about 40%, and down to about 30%, down to about 25%, down to about 20%, or less. In some implementations, a finite (albeit relatively small) volume of the head space 140b can be retained to allow for thermal expansion of the suspension of the nanowires 120b, when subjected to a typical range of temperature variations during storage and shipping.

Alternatively, or in conjunction with sizing of the head space 140b, the extent of evaporation of the solvent 110b can be reduced by configuring a closure 150b of the container 100b to be substantially leak-proof. The closure 150b can be implemented as, for example, a cap, which can be secured to the neck portion of the container 100b through threads formed on the neck portion and optionally a set of seal rings. An example of leak testing is explained as follows. The container 100b can be filled with a volume of water or other liquid. Next, the closure 150b can be screwed onto the neck portion of the container 100b at a specified torque value. The container 100b can be inverted, so that water covers the junction of the neck portion and the closure 150b. A suitable air pressure (e.g., 2 psig) can be applied for a period of time (e.g., 2 minutes). Once the pressure is released, the closure 150b can be removed and inspected. If substantially no water is found on the closure 150b or the threads, the container 100b can be determined to be leak-proof. To further reduce the extent of evaporation, a tape or film can be wrapped around the closure 150b, the neck portion of the container 100b, the body portion of the container 100b, or any combination thereof.

Another solution to the problem of nanowire agglomeration is to configure the container 100b so as to inhibit wetting of a wall 155b of the container 100b by the solvent 110b, inhibit adhesion of the nanowires 120b to the wall 155b, or both. In some implementations, the wall 155b of the container 100b can be formed of, or coated with, a material that is resistant to wetting by the solvent 110b, that is resistant to adhesion of the nanowires 120b from the suspension, or both. In some implementations, a particular material can be used to form or coat the wall 155b to provide a combination of wetting- and adhesion-resistant properties. In other implementations, a combination of different materials can be used to form or coat the wall 155b to provide a combination of wetting- and adhesion-resistant properties. For the given container 100b, a similar solution to the problem is to suitably select the solvent 110b such that the solvent 110b has a tendency to avoid or reduce contact with a material forming or coating the wall 155b.

Figure 2:
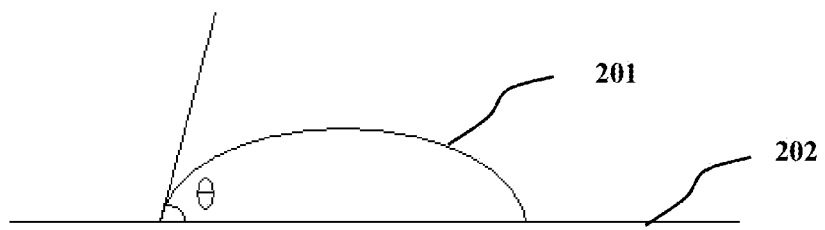
FIG. 2 shows a contact angle between a solid surface and a drop of a given liquid disposed on the surface, in accordance with an embodiment of this disclosure.

As can be understood, wetting or wettability typically refers to the tendency of a liquid to maintain or avoid contact with a solid surface, resulting from intermolecular interactions when the liquid and the solid surface are brought together. An extent of wetting can be determined by a force balance between adhesive and cohesive forces, where adhesive forces between a liquid and a solid surface can cause a liquid drop to spread across the surface, while cohesive forces within the liquid can cause the drop to ball up and avoid contact with the surface. One measure of wettability is a contact angle between a solid surface and a drop of a given liquid disposed on the surface. As shown in FIG. 2 according to an embodiment of this disclosure, the contact angle ($\theta$) is the angle at which the liquid-vapor interface intersects the solid-liquid interface. In this embodiment, a drop of liquid 201 is placed on a solid surface 202. As the tendency of the liquid 201 to spread over the solid surface 202 increases, the contact angle decreases. Conversely, as the tendency of the liquid 201 to spread over the solid surface decreases 202, the contact angle increases. Thus, the contact angle provides an inverse measure of wetting. A contact angle less than 90° (low contact angle) typically indicates that wetting of a surface is favorable (high wetting), and a liquid will tend to spread over the surface. Contact angles greater than or equal 90° (high contact angle) typically indicate that wetting of the surface is unfavorable (low wetting), and the liquid will tend to avoid or reduce contact with the surface and form a compact liquid drop.

Referring back to FIG. 1(b), suitable wetting-resistant materials, which can be used to form or coat the wall 155b of the container 100b, include those having contact angles greater than or equal to 90°, such as greater than or equal to about 95°, greater than or equal to about 100°, greater than or equal to about 105°, greater than or equal to about 110°, greater than or equal to about 115°, greater than or equal to about 120°, greater than or equal to about 125°, greater than or equal to about 130°, greater than or equal to about 135°, greater than or equal to about 140°, greater than or equal to about 145°, or greater than or equal to about 150°, and up to about 160°, up to about 170°, up to about 175°, or more. Such contact angles can be specified for a given liquid, such as the solvent 110b in which the nanowires 120b are suspended.

The use of a wetting-resistant material can provide various benefits in terms of addressing the problem of nanowire agglomeration. For example, and referring to FIG. 1(b), as the container 100b is tilted, agitated, or otherwise moved during handling or shipping, portions of the suspension can be displaced and can be spread along the wall 155b of the container 100b. Due to the low wetting nature of inner wall surfaces, the solvent 110b will tend to avoid or reduce contact with the inner wall surfaces and rapidly slide down the inner wall surfaces towards the remainder of the suspension, such as in the form of compact liquid drops. As the solvent 110b slides down the wall 155b, nanowires 120b are carried along with the solvent 110b towards the remainder of the suspension, thereby mitigating against the nanowires 120b remaining on the wall 155b and becoming entangled as agglomerates.

As another example, the low wetting nature of inner wall surfaces can influence a shape of a liquid meniscus so as to inhibit nanowire agglomeration. FIG. 3(a), FIG. 3(b), and FIG. 3(c) show different shapes of a liquid meniscus that can result from adjusting a wettability of inner wall surfaces, in accordance with an embodiment of this disclosure. Specifically, FIG. 3(a) shows the scenario of a high wetting inner wall surface, in which the liquid meniscus takes on a concave shape as a liquid spreads upwardly along a wall 355a, FIG. 3(b) shows the scenario of an intermediate wetting inner wall surface, in which the liquid meniscus takes on a relatively flat or horizontal shape adjacent to a wall 355b, and FIG. 3(c) shows the scenario of a low wetting inner wall surface, in which the liquid meniscus takes on a convex shape as a liquid reduces contact with a wall 355c by displacing away from the wall 355c. In the high wetting scenario of FIG. 3(a), the spreading of the liquid along the wall 355c increases a surface area of the wall 355 that can come in contact with nanowires 320a and, thus, increases the likelihood of some of the nanowires 320a adhering to the wall 355a, such as in the event of evaporation. In contrast, for the low wetting scenario of FIG. 3(c), the displacement of the liquid away from the wall 355c reduces a surface area of the wall 355c that can come in contact with nanowires 320c and, thus, reduces the likelihood of adhesion of the nanowires 320c to the wall 355c.

Alternatively, or in conjunction with the influence of surface wettability, the adhesion of nanowires to inner wall surfaces can be influenced by surface chemistry of inner wall surfaces. For example, glass and similar materials can have dangling bonds, which typically refer to unsatisfied valences in constituent atoms. Without wishing to be tied to a particular theory of operation, the presence of such dangling bonds on an inner wall surface can promote chemical interaction between the inner wall surface and nanowires from a suspension, thereby increasing the likelihood of adhesion of the nanowires to the inner wall surface. Such adhesion of the nanowires can occur even in the substantial absence of evaporation and even in the substantial absence of tilting, agitation, or other movement of a container holding the suspension of the nanowires. FIG. 4(a) shows the scenario of a wall 455a formed of glass or another similar material to which nanowires 420a are adhered, and FIG. 4(b) shows the scenario of a wall 455b formed of an adhesion-resistant material to which nanowires 420b are inhibited from adhering.

Examples of suitable wetting- and adhesion-resistant materials include fluorinated polymers (or fluoropolymers), such as fluorocarbon-based polymers with carbon-fluorine bonds. The strength and stability of carbon-fluorine bonds contributes to the wetting-resistant, low-stick, and low-friction nature of fluorinated polymers, and the substantial absence of dangling bonds contributes to the adhesion-resistant nature of fluorinated polymers towards nanowires. Fluorinated polymers can be fully fluorinated, such as where all available carbon-hydrogen bonds of a corresponding hydrocarbon-based polymer are replaced by carbon-fluorine bonds, or can be partially fluorinated, such as where a subset of available carbon-hydrogen bonds of a corresponding hydrocarbon-based polymer is replaced by carbon-fluorine bonds. Fluorinated polymers can be a homopolymer including one type of monomeric unit, or can be a copolymer including more than one type of monomeric unit.

Examples of suitable fluorinated polymers include:

(1) Polyvinyl fluoride (or PVF), which can be represented as:

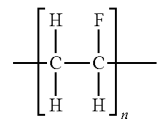

(2) Polyvinylidene difluoride (or PVDF), which can be represented as:

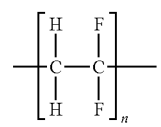

(3) Polytetrafluoroethylene (or PTFE), which can be represented as:

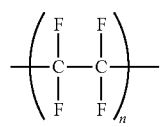

(4) Polychlorotrifluoroethylene (or PCTFE or PTFCE), which can be represented as:

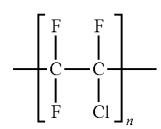

(5) Perfluoroalkoxy polymer (or PFA), which can be represented as:

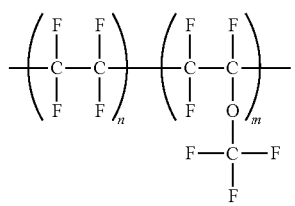

(6) Fluorinated ethylene propylene (or FEP), which can be represented as:

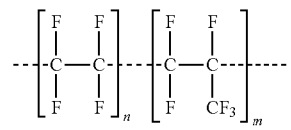

(7) Ethylene tetrafluoroethylene (or poly(ethylene-co-tetrafluoroethylene) or ETFE), which can be represented as:

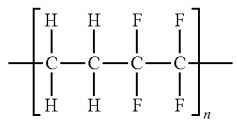

(8) Ethylene chlorotrifluoroethylene (or poly(ethylene-co-chlorotrifluoro ethylene) or ECTFE), which can be represented as:

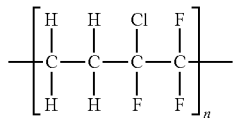

(9) Perfluorosulfonic acid (or PFSA)
(10) Perfluoropolyether (or PFPE)
(11) Fluorocarbon (chlorotrifluoroethylenevinylidene fluoride) (or FPM/FKM)
(12) Perfluorinated elastomer (perfluoroelastomer) (or FFPM/FFKM)
(13) Perfluoropolyoxetane
(14) Combinations of two or more of the foregoing fluorinated polymers.

Additional examples of suitable wetting- and adhesion-resistant materials include high-density polyethylene with a density greater or equal to 0.941 g/cm$^3$; inorganic polymers, such as silicon-based polymers; superhydrophobic materials; superhydrophilic materials; and combinations thereof.

Referring back to FIG. 1(b), substantially all of the inner wall surfaces of the container 100b can be formed of, or coated with, a fluorinated polymer in some implementations. To reduce costs associated with the use of a fluorinated polymer (which can be several times that of other non-fluorinated materials), a fraction of the inner wall surfaces of the container 100b can be formed of, or coated with, a fluorinated polymer. For example, portions of the wall 155b corresponding to the main body portion and the lower half of the neck portion of the container 100b (which are more likely to come into contact with the nanowire suspension) can be formed of, or coated with, a fluorinated polymer, while a remaining portion of the wall 155b can be formed of, or coated with, a glass, a non-fluorinated polymer, or other non-fluorinated material. As another example, a portion of the wall 155b surrounding the liquid meniscus in the neck portion of the container 100b (which is more likely to come into contact with some of the nanowires 120b in the event of evaporation) can be formed of, or coated with, a fluorinated polymer, while a remaining portion of the wall 155b can be formed of, or coated with, a glass, a non-fluorinated polymer, or other non-fluorinated material. Optionally, the closure 150b also can be formed of, or coated with, a fluorinated polymer.

Figure 5:
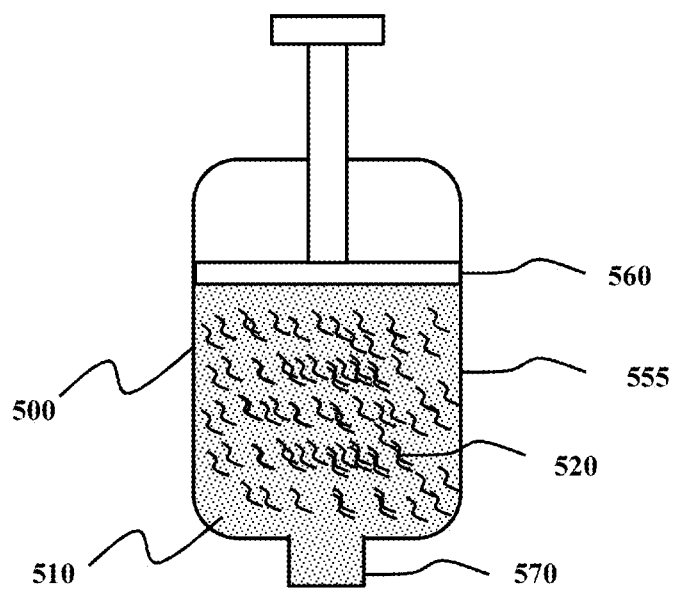
FIG. 5 shows a further solution to the problem of agglomeration of nanowires stored in a container, in accordance with an embodiment of this disclosure.

A further solution to the problem of nanowire agglomeration is shown in FIG. 5 according to an embodiment of this disclosure. In this embodiment, a container 500 is configured similar to a syringe to provide an adjustable head space. Specifically, the container 500 includes a moveable plunger 560 sized and shaped to fit an internal cross-section of the container 500, and a suspension of nanowires 520 in a solvent 510 is confined to a volume between the plunger 560 and an opening 570 of the container 500. Movement of the plunger 560 can displace the suspension towards the opening 570 such that the head space is reduced and substantially eliminated, thereby inhibiting evaporation of the solvent 510 from the suspension.

To further inhibit agglomeration of nanowires, a wall 555 of the container 500 can be formed of, or coated with, a material that is resistant to wetting by the solvent 510, resistant to adhesion of the nanowires 520, or both. For example, the wall 555 of the syringe-type container 500 shown in FIG. 5 can be formed of, or coated with, a fluorinated polymer.

By storing nanowires according to the techniques described herein, a number of benefits can be attained. In some implementations, nanowires of higher aspect ratios, greater lengths, and smaller diameters can be subjected to extended storage while reducing or inhibiting the formation of agglomerates of the nanowires. In some implementations, nanowires of higher concentrations can be subjected to extended storage while reducing or inhibiting the formation of agglomerates of the nanowires.

For example, among nanowires (e.g., silver nanowires) in a suspension stored in a container, at least about 30% of the nanowires (e.g., by number) can have an aspect ratio of at least about 50, such as at least about 35%, at least about 40%, at least about 45%, at least about 50%, at least about 55%, at least about 60%, at least about 65%, or at least about 60%, and up to about 80%, up to about 90%, or more. In some implementations, at least about 25% of the nanowires (e.g., by number) can have an aspect ratio of at least about 100, such as at least about 30%, at least about 35%, at least about 40%, at least about 45%, at least about 50%, at least about 55%, at least about 60%, or at least about 65%, and up to about 75%, up to about 85%, or more. In other implementations, at least about 20% of the nanowires (e.g., by number) can have an aspect ratio of at least about 200, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have an aspect ratio of at least about 400, such as at least about 25%, at least about 30%, at least about 35%, at least about 40%, at least about 45%, at least about 50%, at least about 55%, or at least about 60%, and up to about 70%, up to about 80%, or more.

As another example, among nanowires (e.g., silver nanowires) in the suspension, at least about 30% of the nanowires (e.g., by number) can have a length of at least about 10 μm, such as at least about 35%, at least about 40%, at least about 45%, at least about 50%, at least about 55%, at least about 60%, at least about 65%, or at least about 60%, and up to about 80%, up to about 90%, or more. In some implementations, at least about 25% of the nanowires (e.g., by number) can have a length of at least about 20 μm, such as at least about 30%, at least about 35%, at least about 40%, at least about 45%, at least about 50%, at least about 55%, at least about 60%, or at least about 65%, and up to about 75%, up to about 85%, or more. In other implementations, at least about 20% of the nanowires (e.g., by number) can have a length of at least about 30 μm, such as at least about 25%, at least about 30%, at least about 35%, at least about 40%, at least about 45%, at least about 50%, at least about 55%, or at least about 60%, and up to about 70%, up to about 80%, or more.

As another example, among nanowires (e.g., silver nanowires) in the suspension, at least about 30% of the nanowires (e.g., by number) can have a diameter equal to or less than about 100 nm, such as at least about 35%, at least about 40%, at least about 45%, at least about 50%, at least about 55%, at least about 60%, at least about 65%, or at least about 60%, and up to about 80%, up to about 90%, or more. In some implementations, at least about 25% of the nanowires (e.g., by number) can have a diameter equal to or less about 60 nm, such as at least about 30%, at least about 35%, at least about 40%, at least about 45%, at least about 50%, at least about 55%, at least about 60%, or at least about 65%, and up to about 75%, up to about 85%, or more. In other implementations, at least about 20% of the nanowires (e.g., by number) can have a diameter equal to or less about 40 nm, such as at least about 25%, at least about 30%, at least about 35%, at least about 40%, at least about 45%, at least about 50%, at least about 55%, or at least about 60%, and up to about 70%, up to about 80%, or more.

As another example, a concentration of nanowires in the suspension can be about 4 mg/mL or greater, such as about 5 mg/mL or greater, about 6 mg/mL or greater, about 7 mg/mL or greater, about 8 mg/mL or greater, about 9 mg/mL or greater, about 10 mg/mL or greater, about 11 mg/mL or greater, or 12 mg/mL or greater, and up to about 15 mg/mL, up to about 16 mg/mL, or more.

By reducing or inhibiting agglomerate formation, a shelf life of a suspension of nanowires stored in a container can be extended, such that the shelf life can be at least about 14 days, at least about 30 days, at least about 60 days, at least about 90 days, at least about 120 days, at least about 150 days, at least about 180 days, at least about 210 days, at least about 240 days, or at least about 365 days, and up to about 390 days, up to about 420 days, or more. In some implementations, a shelf life of a suspension of nanowires can be characterized in terms of an extent of agglomerate formation remaining within an acceptable level over a time period corresponding to the shelf life. The extent of agglomerate formation can be characterized according to any one or a combination of two or more of the following tests:

(1) A concentration of nanowires that remain dispersed in a suspension (or can be re-dispersed by, for example, gentle agitation) can be measured after a time period of storage in a container, such as using an optical technique. For example, a concentration of silver nanowires in a suspension can be measured by optical absorption in the ultraviolet (or UV) to visible (or vis) portion of the electromagnetic spectrum. The concentration of nanowires in the suspension (or a sample taken from the suspension) can be determined from measurements of optical density, which can be measured by transmitting light through the suspension along a particular direction and determining the attenuation of the light. The light can be attenuated mainly due to scattering, although some absorption also can be involved. The measured attenuation can be compared to an initial attenuation measurement, or can be compared to attenuation measurements for suspensions of known nanowire concentration. An extent of agglomerate formation in the suspension can be deemed to be acceptable over a time period if a decrease in nanowire concentration is less than or equal to about 10% of an initial nanowire concentration, such as less than or equal to about 9%, less than or equal to about 8%, less than or equal to about 7%, less than or equal to about 6%, less than or equal to about 5%, less than or equal to about 4%, less than or equal to about 3%, less than or equal to about 2%, or less than or equal to about 1%.

(2) An amount of nanowires that are adhered to walls of a container can be measured after a time period of storage in the container, such as by scrapping the walls or by suitable chemical treatment. Nanowires that precipitate as clumps also can be accounted for in such evaluation. For example, a weight of silver nanowires adhered to walls of a container can be measured, and compared to an initial weight of silver nanowires disposed in the container, which can be estimated according to, for example, an initial nanowire concentration and an initial volume of a nanowire suspension. An extent of agglomerate formation in the suspension can be deemed to be acceptable over a time period if the weight of the adhered silver nanowires is less than or equal to about 10% of the initial weight of silver nanowires, such as less than or equal to about 9%, less than or equal to about 8%, less than or equal to about 7%, less than or equal to about 6%, less than or equal to about 5%, less than or equal to about 4%, less than or equal to about 3%, less than or equal to about 2%, or less than or equal to about 1%.

(3) The presence and sizes of any agglomerates in a suspension can be measured after a time period of storage in a container using a fineness of grind gauge. As can be understood, a fineness of grind gauge typically includes a trough of variable depth. The top corresponds to a deepest portion of the trough, and the presence and number of agglomerates of each size can be determined by their location along the trough. Agglomerates can be visible as point defects or streaks. For streaks, the location can be recorded as an onset of the streak, namely a portion of the streak that is closest to the top of the gauge.

The measured number of agglomerates of each size can be compared to a reference agglomerate size distribution for an acceptable suspension to determine whether a suspension at issue is acceptable. It is noted that the specification of a reference agglomerate size distribution can depend on a particular application for a nanowire suspension. In some implementations, a reference agglomerate size distribution can be specified by measuring an agglomerate size distribution for different nanowire suspensions, using the suspensions in a desired application (e.g., forming coatings or films for transparent conductive electrodes), analyzing results of the application to determine whether the results are of acceptable quality, and correlating the agglomerate size distributions to the quality of the results obtained using the suspensions.

For example, a reference agglomerate size distribution for an acceptable suspension for some applications can be specified as: a) no more than 3, no more than 2, no more than 1, or the absence of agglomerates having a size of about 100 µm or greater; b) no more than 3, no more than 2, no more than 1, or the absence of agglomerates having a size of about 90 µm or greater; c) no more than 3, no more than 2, no more than 1, or the absence of agglomerates having a size of about 80 µm or greater; d) no more than 3, no more than 2, no more than 1, or the absence of agglomerates having a size of about 70 µm or greater; e) no more than 3, no more than 2, no more than 1, or the absence of agglomerates having a size of about 60 µm or greater; f) no more than 3, no more than 2, no more than 1, or the absence of agglomerates having a size of about 50 µm or greater; g) no more than 3, no more than 2, no more than 1, or the absence of agglomerates having a size of about 40 µm or greater; or h) a combination of two or more of the foregoing.

(4) After a time period of storage in a container, a suspension of nanowires can be used in a desired application (e.g., forming coatings or films for transparent conductive electrodes), and results of the application can be analyzed to determine whether the results are of acceptable quality. For example, a suspension of silver nanowires can be stored over a time period, and then used to form a coating or a film for a transparent conductive electrode. Values for any one or a combination of haze, transmittance, and sheet resistance can be measured, and compared to corresponding reference values, such as for a suspension of silver nanowires prior to storage. An extent of agglomerate formation in the suspension at issue can be deemed to be acceptable over the time period if the difference in values for any one or a combination of haze, transmittance, and sheet resistance is less than or equal to about ±10% of the corresponding reference values, such as less than or equal to about ±9%, less than or equal to about ±8%, less than or equal to about ±7%, less than or equal to about ±6%, less than or equal to about ±5%, less than or equal to about ±4%, less than or equal to about ±3%, less than or equal to about ±2%, or less than or equal to about ±1%.

Additional Embodiments

The techniques described herein in the context of storage of nanostructures have applicability for other aspects of the handling of nanostructures. Specifically, nanowire suspensions can become less stable when subjected to shear forces. Shear forces can exert a torque on nanowires, and the rotational of several nanowires near each other can lead to their bundling together to form largely irreversible agglomerates. Accordingly, delivery or transfer of a nanowire suspension into and out of a container should reduce or minimize shear forces.

To reduce shear forces, fluid delivery or transfer components, such as tubing, pipes, pipettes, and so forth, can be formed of, or coated with, a low-stick or a low-friction material, such as a fluorinated polymer described above. In addition, sizes or shapes of fluid delivery components can be selected to further reduce shear forces, such as by using a tubing of greater cross-sectional diameter to transfer a nanowire suspension into and out of a container. Moreover, low shear pumps can be used, such as lobe pumps, internal gear pumps, and progressive cavity pumps. In addition, coating equipment and related components, such as slot dies, can be formed of, or coated with, a low-stick or a low-friction material, such as a fluorinated polymer described above.

Example

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Suspensions of silver nanowires are stored in different types of bottles, and the extent of agglomerate formation is evaluated for the bottles. FIG. 6(a) shows silver nanowires suspended in isopropyl alcohol (or IPA) about 1 min after shaking in a glass bottle. As seen in FIG. 6(a), the suspension is not undergoing noticeable de-wetting from inner wall surfaces. FIG. 6(b) shows silver nanowires in IPA in the same container about 2 hr after shaking. The suspension in the head space has largely dried up through IPA evaporation, and nanowire agglomerates are adhered to inner wall surfaces. FIG. 6(c) shows silver nanowires in IPA after storage in a glass bottle for about 2 weeks. Significant agglomerations are seen on inner wall glass surfaces.

Figures 7A, 7B, 7C:
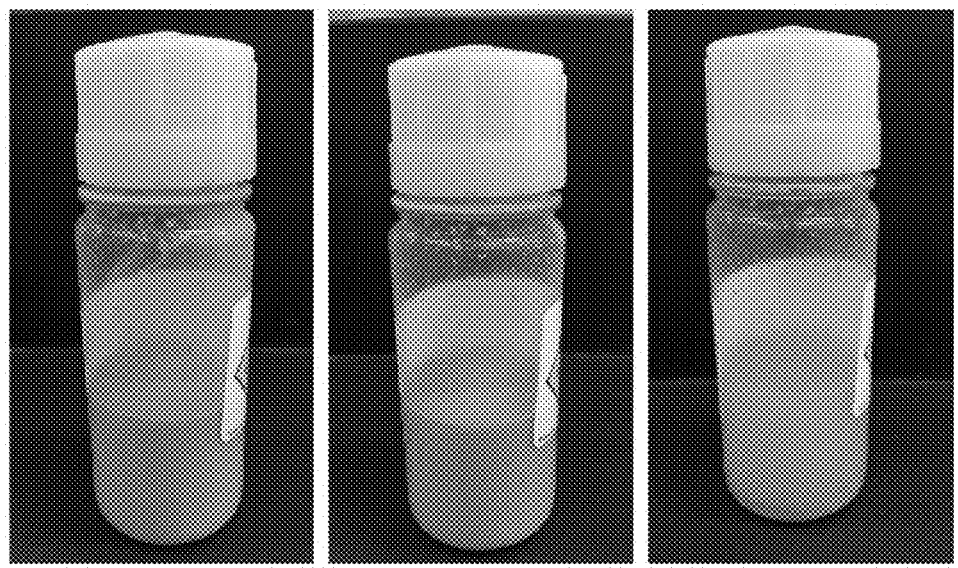
FIG. 7(a), FIG. 7(b), and FIG. 7(c) are images showing evaluation results in connection with some aspects of this disclosure.

In comparison, FIG. 7(a) shows silver nanowires suspended in IPA about 20 sec after shaking in a perfluoroalkoxy polymer (or PFA) bottle. As seen in FIG. 7(a), the suspension is de-wetting from inner wall surfaces. FIG. 7(b) shows silver nanowires in IPA in the same container about 1 min after shaking. The suspension in the head space has largely de-wetted from inner wall surfaces. FIG. 7(c) shows silver nanowires in IPA after storage in the PFA bottle for about 2 weeks. Silver nanowires have settled towards a bottom of the PFA bottle. IPA has evaporated into a head space, and small quantities of agglomerations are seen adhered to inner wall surfaces.

Figures 8A, 8B, 8C:
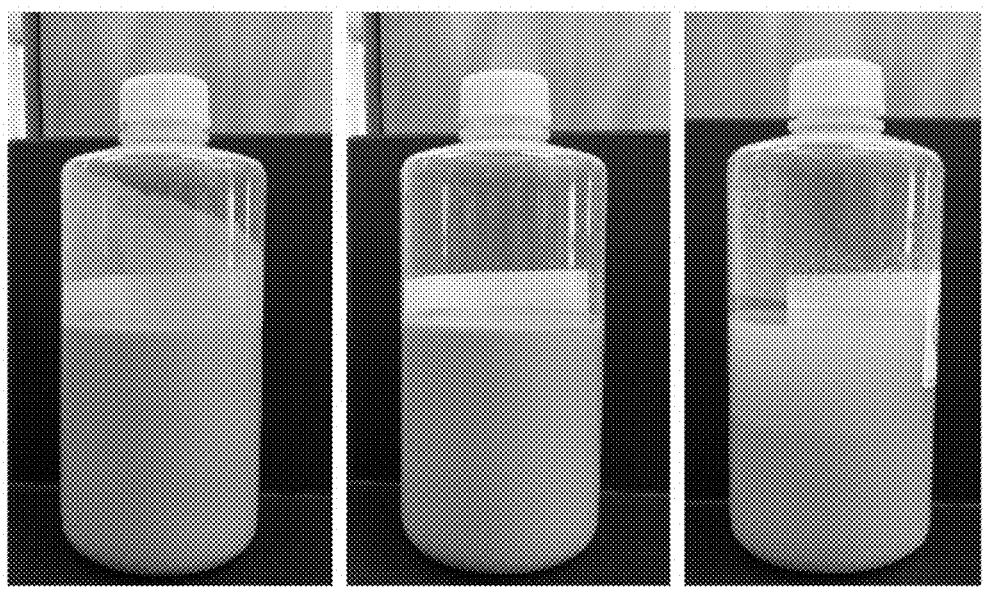
FIG. 8(a), FIG. 8(b), and FIG. 8(c) are images showing evaluation results in connection with some aspects of this disclosure.

As another comparison, FIG. 8(a) shows silver nanowires suspended in IPA about 10 sec after shaking in a fluorinated ethylene propylene (or FEP) bottle. As seen in FIG. 8(a), the suspension is de-wetting from inner wall surfaces. FIG. 8(b) shows silver nanowires in IPA in the same container about 30 sec after shaking. The suspension in the head space has substantially de-wetted from inner wall surfaces at a faster rate compared to a PFA surface. FIG. 8(c) shows silver nanowires in IPA after storage in the FEP bottle for about 2 weeks. Silver nanowires have settled towards a bottom of the FEP bottle. IPA has evaporated into a head space and condensed as beads, but little or agglomerations are seen adhered to inner wall surfaces.

From the evaluation, it was determined that silver nanowires were prone to adhere to walls of glass bottles and not to walls of FEP bottles. When a suspension of silver nanowires in an alcohol was subjected to extended storage in a glass bottle, the nanowires were found to adhere to walls of the glass bottle as the alcohol evaporated, but little or no adhesion to walls is observed when a suspension with the same composition was similarly stored in a FEP bottle. Without being tied to a particular theory of operation, the relatively low surface wettability of fluorinated polymers compared to that of glass may account for the observed difference between the FEP and glass bottles. Also, according to the evaluation, PFA shows less adhesion of silver nanowires compared to glass, but somewhat more compared to FEP, particularly at higher concentrations of silver nanowires.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A method of storing nanowires, comprising:
providing a nanowire suspension including nanowires suspended in a liquid; and
disposing the nanowire suspension in a container for storage, wherein the container is configured to inhibit agglomeration of nanowires from the nanowire suspension,
wherein a wall of the container is formed of, or coated with, a fluorinated polymer.

2. The method of claim 1, wherein a head space of the container is sized to inhibit evaporation of the liquid from the nanowire suspension.

3. The method of claim 1, wherein the wall of the container is resistant to adhesion of nanowires from the nanowire suspension.

4. The method of claim 1, wherein the wall of the container is resistant to wetting by the liquid.

5. The method of claim 1, wherein the fluorinated polymer is selected from polytetrafluoroethylene, fluorinated ethylene propylene, and ethylene tetrafluoroethylene.

6. The method of claim 1, wherein:
a head space of the container is sized to inhibit evaporation of the liquid from the nanowire suspension; and the wall of the container is resistant to wetting by the liquid.

7. The method of claim 6, wherein the fluorinated polymer is fluorinated ethylene propylene.

8. The method of claim 1, wherein the container includes a moveable plunger sized and shaped to fit an internal cross-section of the container, and disposing the nanowire suspension in the container includes confining the nanowire suspension to a volume between the moveable plunger and an opening of the container.

9. The method of claim 8, wherein the wall of the container is resistant to wetting by the liquid.

10. The method of claim 1, wherein disposing the nanowire suspension in the container is performed subsequent to synthesis of the nanowires in the nanowire suspension.

11. A method of storing nanowires, comprising:
providing a nanowire suspension including nanowires suspended in a liquid; and disposing the nanowire suspension in a container for storage, wherein a wall of the container is at least one of: (1) resistant to adhesion of nanowires from the nanowire suspension; and (2) resistant to wetting by the liquid, wherein the wall of the container is formed of, or coated with, a fluorinated polymer.

12. The method of claim 11, wherein the fluorinated polymer is fluorinated ethylene propylene.

13. The method of claim 11, wherein a head space of the container is sized to inhibit evaporation of the liquid from the nanowire suspension.

* * * * *